United States Patent
Niwa et al.

(10) Patent No.: US 10,693,741 B2
(45) Date of Patent: Jun. 23, 2020

(54) NETWORK MONITORING SYSTEM, NETWORK MONITORING METHOD, AND COMPUTER-READABLE STORAGE MEDIUM

(71) Applicant: KDDI CORPORATION, Tokyo (JP)

(72) Inventors: Tomonobu Niwa, Fujimino (JP); Masanori Miyazawa, Fujimino (JP); Michiaki Hayashi, Fujimino (JP)

(73) Assignee: KDDI CORPORATION, Tokyo (JP)

(*) Notice: Subject to any disclaimer, the term of this patent is extended or adjusted under 35 U.S.C. 154(b) by 173 days.

(21) Appl. No.: 15/901,744

(22) Filed: Feb. 21, 2018

(65) Prior Publication Data

US 2018/0183682 A1  Jun. 28, 2018

Related U.S. Application Data

(63) Continuation of application No. PCT/JP2016/075642, filed on Sep. 1, 2016.

(30) Foreign Application Priority Data

Sep. 2, 2015  (JP) ................. 2015-172958

(51) Int. Cl.
*H04L 12/24*  (2006.01)
*G06F 11/30*  (2006.01)
(Continued)

(52) U.S. Cl.
CPC ........ *H04L 41/147* (2013.01); *G06F 9/45558* (2013.01); *G06F 9/46* (2013.01);
(Continued)

(58) Field of Classification Search
CPC . H04L 41/147; H04L 41/046; G06F 9/45558; G06F 11/3006; G06F 11/3428; G06F 2009/45591; G06F 2009/45595
See application file for complete search history.

(56) References Cited

U.S. PATENT DOCUMENTS 9,065,728 B2   6/2015  Shimokawa et al.
9,494,932 B2  11/2016  Kawai
(Continued)

FOREIGN PATENT DOCUMENTS

CN      1882924 A    12/2006
CN    101136784 A     3/2008
(Continued)

OTHER PUBLICATIONS

International Search Report dated Nov. 22, 2016, issued in corresponding International Patent Application No. PCT/JP2016/075642. (4 pages).
(Continued)

*Primary Examiner* — Arvin Eskandarnia
(74) *Attorney, Agent, or Firm* — Fitch, Even, Tabin & Flannery LLP (57) ABSTRACT

A network monitoring system comprising: a prediction unit configured to acquire information needed for detecting an abnormality in a virtual network function provided in a virtualization infrastructure, and predict performance information of a virtual network function that is to be newly provided and monitored; a generation unit configured to generate an abnormality determination rule to serve as a reference for determining whether or not actual performance information of a virtual network function falls within an allowed range that is set based on the predicted performance information; a determination unit configured to perform abnormality determination using the actual performance information of the virtual network function and the abnormality determination rule; and an output unit configured to output an abnormality notification if it is determined by the determination unit that there is an abnormality.

12 Claims, 7 Drawing Sheets

(51) Int. Cl.
*G06F 11/34* (2006.01)
*H04M 3/22* (2006.01)
*G06F 9/46* (2006.01)
*H04L 12/26* (2006.01)
*H04M 3/00* (2006.01)
*G06F 9/50* (2006.01)
*G06F 9/455* (2018.01)

(52) U.S. Cl.
CPC ........ *G06F 9/5077* (2013.01); *G06F 11/3006* (2013.01); *G06F 11/34* (2013.01); *G06F 11/3409* (2013.01); *G06F 11/3428* (2013.01); *G06F 11/3452* (2013.01); *H04L 41/046* (2013.01); *H04L 41/0681* (2013.01); *H04L 41/0893* (2013.01); *H04L 41/0896* (2013.01); *H04L 41/142* (2013.01); *H04L 43/0817* (2013.01); *H04L 43/16* (2013.01); *H04M 3/00* (2013.01); *H04M 3/22* (2013.01); *G06F 2009/45591* (2013.01); *G06F 2009/45595* (2013.01); *H04L 43/06* (2013.01); *H04L 43/08* (2013.01)

(56) References Cited

U.S. PATENT DOCUMENTS

| | | |
|---|---|---|
| 2002/0138753 A1 | 9/2002 | Munson |
| 2006/0109793 A1* | 5/2006 | Kim ...................... H04L 41/145 370/250 |
| 2007/0083938 A1 | 4/2007 | Aoki et al. |
| 2012/0284713 A1 | 11/2012 | Ostermeyer et al. |
| 2013/0080625 A1* | 3/2013 | Morinaga ............. G06F 21/552 709/224 |
| 2015/0032793 A1* | 1/2015 | Dogu ...................... H04L 67/06 709/201 |
| 2015/0081882 A1 | 3/2015 | Bartucca et al. |
| 2015/0161008 A1* | 6/2015 | Antony ............... G06F 11/1448 714/16 |
| 2015/0180730 A1 | 6/2015 | Felstaine et al. |
| 2016/0077861 A1* | 3/2016 | Furutani ............. G06F 9/45558 718/1 |
| 2016/0139977 A1* | 5/2016 | Ashani ................ G06F 11/0706 714/26 |
| 2018/0210771 A1* | 7/2018 | Sato ........................ G06F 9/546 |

FOREIGN PATENT DOCUMENTS

| | | |
|---|---|---|
| CN | 101398768 A | 4/2009 |
| CN | 101969391 A | 2/2011 |
| CN | 104583887 A | 4/2015 |
| JP | 2013-214171 A | 10/2013 |
| JP | 5590196 B2 | 8/2014 |
| JP | 5666685 B2 | 12/2014 |
| JP | 2015-050772 A | 3/2015 |
| JP | 2015-56182 A | 3/2015 |
| JP | 2015-070528 A | 4/2015 |
| WO | 2012/081718 A1 | 6/2012 |
| WO | 2015/032435 A1 | 3/2015 |

OTHER PUBLICATIONS

Chiba et al., "Study on Management and Orchestration Function to Ensure Required Service Levels in NFV Environment", IEICE Technical Report, NS2013-247, vol. 113, No. 472, Feb. 2014, pp. 409 to 414 (English abstract included).
Hato et al., "Implementation and Evaluation of Scale Out and Disaster Recovery Mechanisms between Multiple Different Clouds", Information Processing Society of Japan Journal of Digital Practices, vol. 4, No. 4, Oct. 2013, pp. 314 to 322.
Xia, L. et al., Requirements and Use Cases for Virtual Network Functions, draft-xia-vnfpool-use-cases-02.txt, Nov. 2014 (19 pages).
Extended European Search Report dated Jun. 21, 2018, concerning the corresponding European Patent Application No. 16841963.8 (16 pages).
CNIPA; Application No. 201680049567.5; Office Action dated Feb. 3, 2020.

* cited by examiner

| VNF TYPE | RESOURCE AMOUNT INDEX | | | | | | | PERFORMANCE INFORMATION | | | | | |
|---|---|---|---|---|---|---|---|---|---|---|---|---|---|
| | metric_cpu | metric_mem | metric_nic_in | metric_nic_out | metric_desk_write | metric_desk_read | | CPU [%] | MEM [%] | NIC(in) [Mbps] | NIC(out) [Mbps] | DISK(write) [MB/s] | DISK(read) [MB/s] |
| vNF001 | 1.0 | 1024 | 80 | 80 | 50 | 50 | | 54 | 60 | 22 | 24 | 0.8 | 0 |
| vNF001 | 1.5 | 1536 | 100 | 100 | 50 | 50 | | 49 | 48 | 35 | 34 | 1 | 0 |
| vNF002 | 2.0 | 2048 | 100 | 100 | 100 | 100 | | 70 | 57 | 51 | 51 | 0 | 0 |
| vNF003 | 0.5 | 512 | 10 | 10 | 50 | 50 | | 59 | 59 | 13 | 13 | 2 | 2 |

NETWORK MONITORING SYSTEM, NETWORK MONITORING METHOD, AND COMPUTER-READABLE STORAGE MEDIUM

CROSS-REFERENCE TO RELATED APPLICATIONS

This application is a continuation of International Patent Application No. PCT/JP2016/075642 filed on Sep. 1, 2016, and claims priority to Japanese Patent Application No. 2015-172958 filed on Sep. 2, 2015, the entire content of both of which is incorporated herein by reference.

TECHNICAL FIELD

The present invention relates to a technique for monitoring a virtual network function on a network.

BACKGROUND ART

Conventionally, dedicated apparatuses in which network functions and hardware were integrated were commonly used in communication equipment, but a network function virtualization (NFV) technique for providing a general-purpose server with a network function by making use of a virtualization technique has been attracting attention due to increased functions of general-purpose servers and the advancement of virtualization techniques.

By arranging a virtual network function (VNF) in a virtualization infrastructure (NFVI) using an NFV technique, a reduction in equipment cost, effective use of infrastructure resources, and an increase in the speed of service provision are expected. Furthermore, by providing the virtualization infrastructure with the network function, provision and deletion of the network function are easier, and therefore automization of network operation management is also expected.

The virtual network function is characterized in that the allocation of virtualization infrastructure resources for the VNF, such as distribution of VNF arrangement locations, and CPU and a memory resource amount for the VNF, is flexible. For this reason, for example, a technique of automatically scaling out or scaling in according to the communication amount or server load (auto-scale function) and a technique of automatically recovering from damage by causing a VNF to transition to another healthy server if an abnormality or damage is detected in the VNF (auto-heal function) have been considered. The auto-scale function and the auto-heal function are executed by being triggered by detection of an abnormality in a virtual network function, a virtualization infrastructure, or hardware.

Figure 6:
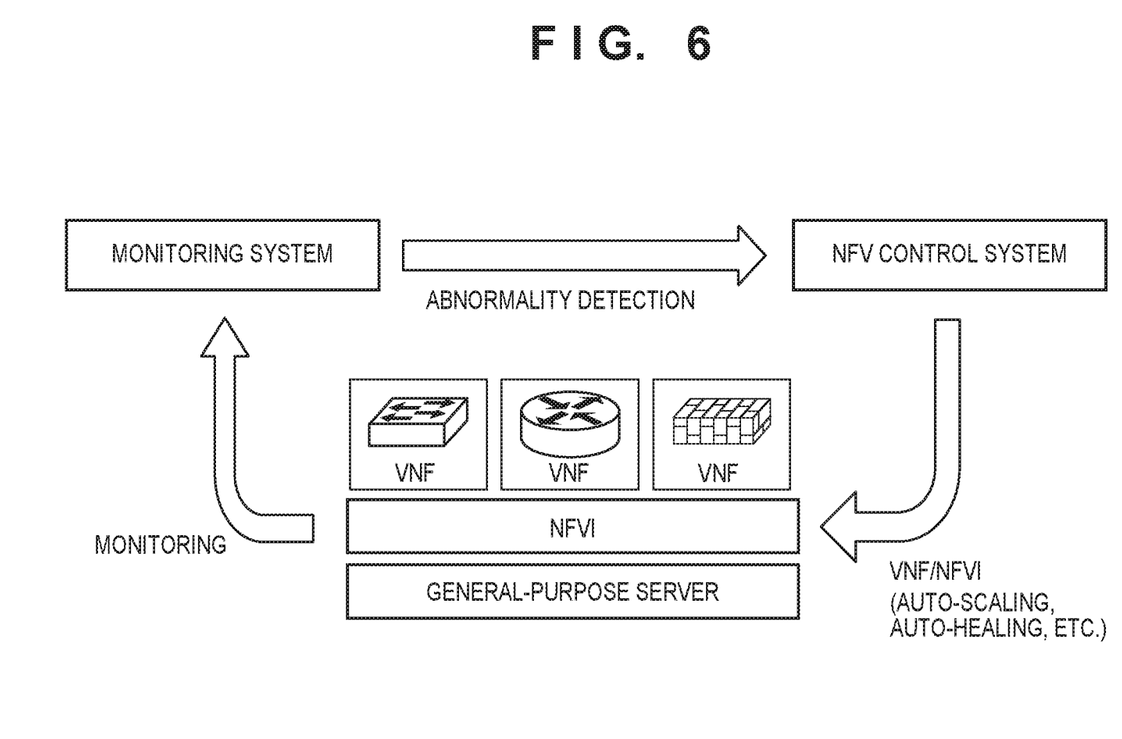
FIG. 6 is a schematic diagram showing a configuration of a conventional network function monitoring system.

FIG. 6 is a schematic diagram showing a configuration of a conventional network function monitoring system. A NFV infrastructure constituted by a hypervisor, a virtual machine, virtual switches, and the like is constructed on a general-purpose server, virtual network functions (VNFs) such as a firewall, a load balancer, and a router are included in the virtualization infrastructure, and a monitoring system monitors these virtual network functions and the virtualization infrastructure. Also, when an abnormality is detected in the monitoring system, abnormality notification is performed to the NFV control system, and after receiving the abnormality notification, the NFV control system operates the VNFs and the NFVI using the auto-scale function, the auto-heal function, and the like.

In this manner, in order to provide a highly-reliable network, it is essential that abnormalities in the network are found out rapidly. However, in particular, in performance monitoring of an NFVI, various types of performance information, such as a CPU usage rate, a memory usage rate, a band usage rate, and a disk usage rate, need to be monitored for a virtualization infrastructure, such as a hypervisor, a virtual machine, or a virtual switch, and therefore the items to be monitored become complicated.

Normally, by providing thresholds for the pieces of performance information, it is determined whether or not there is an abnormality, but settings become complicated accompanying enlargement of the monitoring region and diversification of the items being managed. For example, when an abnormality occurs in a hypervisor, an alarm for performing notification of an abnormality is generated from related virtual machines as well, and therefore as a result, the designation of the abnormal location and the influence range becomes difficult, there is a significant likelihood that the auto-heal function and the auto-scale function will not function appropriately, and there is concern that the real-time property will be lost. Furthermore, in the conventional detection procedure, there is a phenomenon in which an abnormality inside of a virtual switch that crosslinks virtual machines or the like is difficult to detect.

Figure 7:
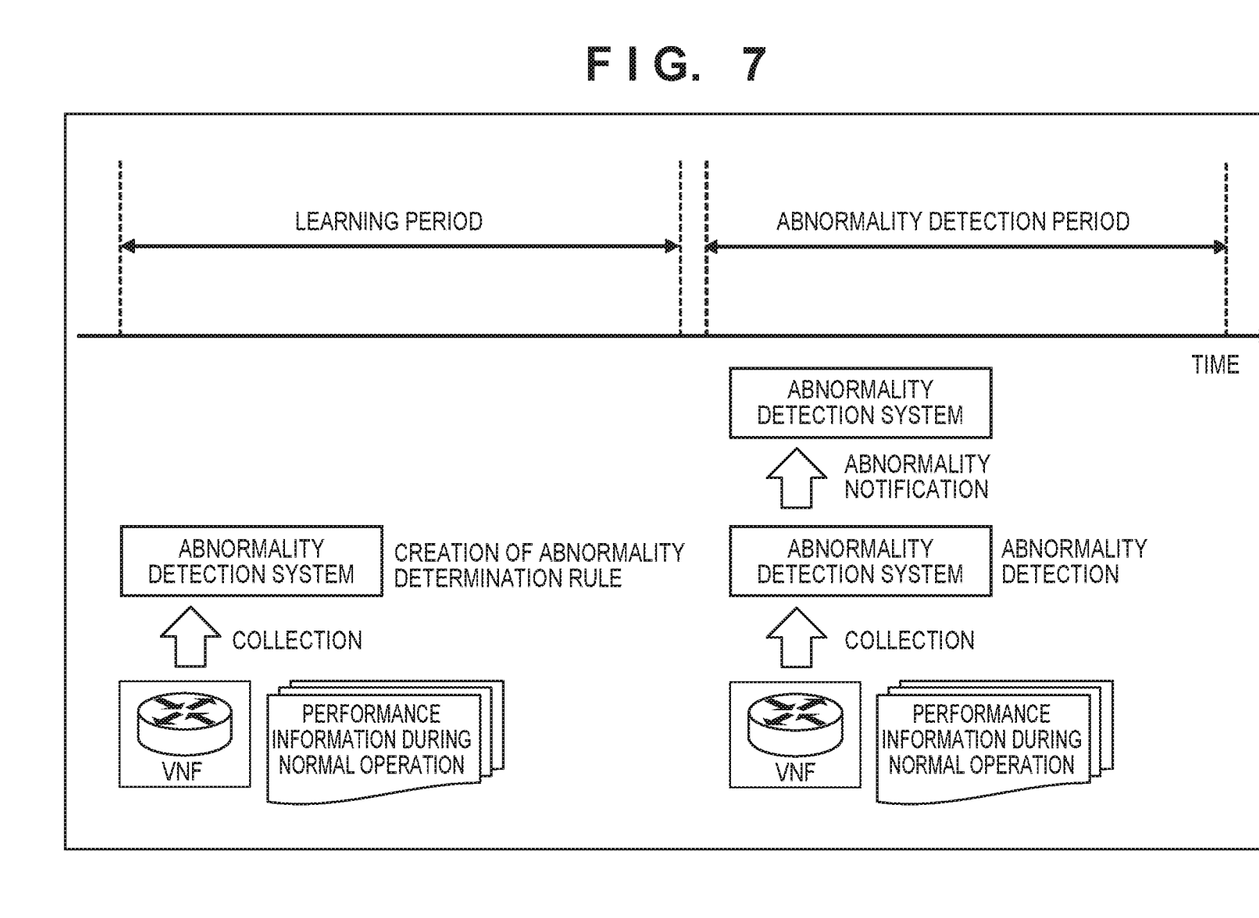
FIG. 7 is a diagram showing a mechanism of a conventional abnormality detection system.

With respect to this kind of problem, PLT1 discloses a technique of detecting an abnormality by comprehensively analyzing the performance information of the NFVI. As shown in FIG. 7, based on the performance information during normal operation of the networks, an abnormality determination rule utilizing statistical processing and machine learning with no teacher is generated, and by comparing the performance information collected in a certain period and the abnormality detection rule, an abnormality detection function is provided.

Also, PLT2 discloses a technique of analyzing the temporal periodicity of the performance information of an apparatus being monitored, deriving an appropriate threshold value based on density distribution model information generated in each of the periods, and detecting an abnormality based on the threshold value.

Also, PLT3 discloses a technique of detecting an abnormality based on whether or not a correlative function generated at a time of normal operation has broken down, by deriving a correlative function for pieces of performance information of any two managed target apparatuses and a time series.

CITATION LIST

Patent Literature

PLT1: Japanese Patent Laid-Open No. 2015-070528
PLT2: Japanese Patent Laid-Open No. 2013-214171
PLT3: Japanese Patent No. 5590196
PLT4: Japanese Patent No. 5666685
PLT5: International Publication No. WO 2012/081718

SUMMARY OF INVENTION

Technical Problem

However, in PLT1, it is necessary to collect performance information for a certain period in order to generate the abnormality determination rule, and for example, if the VNF transitions to other hardware, after the transition, abnormality detection cannot be carried out until the abnormality determination rule is generated.

Also, since a probability distribution model is created in PLT2 and since a correlation model is generated in PLT3, it is necessary to accumulate performance information at a time of normal operation in advance, similarly to PLT1, and for example, if the VNF transitions to other hardware, the abnormality detection cannot be carried out after the transition until the abnormality determination rule is generated.

On the other hand, a technique relating to a method for predicting the performance information during normal operation is disclosed as a technique according to which performance information can be dealt with without performing accumulation in advance. PLT4 discloses a technique in which an aggregated flow is constructed using the information included in the IP header and the TCP/UDP header of the traffic flow included in a group of apparatuses to be monitored, and abnormality detection is performed by generating a reference distribution to be used in abnormality determination according to the aggregated flow. Due to the reference distribution undergoing feedback processing using the newly-acquired flow information, the fluctuating traffic is followed in real time and the accuracy of the abnormality determination is improved. However, with a virtual network function, the performance information during normal operation suddenly changes due to a change in the arrangement location of the VNF and resource allocation in the virtualization infrastructure, and therefore the performance information prediction method disclosed in PLT4 cannot be applied to the virtual network function.

Also, PLT5 discloses a technique for performing performance prediction for an entire virtualization system by generating performance prediction models for the operations of applications and hardware and synthesizing the two performance prediction models in a virtual environment. However, in an embodiment of NFV, since performance prediction models for VNF application operations provided from multiple vendors cannot be generated in a shared manner and cannot be synthesized with that of a hardware operation, performance prediction cannot be performed.

Solution to Problem

According to an aspect of the present invention, a network monitoring system for monitoring a virtual network function, comprising: a prediction unit configured to acquire information needed for detecting an abnormality in a virtual network function provided in a virtualization infrastructure, and predict performance information of a virtual network function that is to be newly provided and monitored; a generation unit configured to generate an abnormality determination rule that is to serve as a reference for determining whether or not actual performance information of a virtual network function falls within an allowed range that is set based on the predicted performance information; a determination unit configured to perform abnormality determination using the actual performance information of the virtual network function and the abnormality determination rule; and an output unit configured to output an abnormality notification if it is determined by the determination unit that there is an abnormality.

Other characteristics and advantages of the present invention will become apparent from the following description with reference to the accompanying drawings. Note that in the accompanying drawings, configurations that are the same or similar are denoted by the same reference numerals.

DESCRIPTION OF EMBODIMENTS

The inventors noticed that when new generation of various virtual network functions occurs or there is a change in the arrangement location of the virtual network function or the allocated resource amount therefore, abnormality detection cannot be carried out promptly due to there not being performance information for determining whether or not there is an abnormality, and the inventors achieved the present invention upon finding that virtual network function abnormality detection can be carried out promptly by accumulating performance information for virtual network functions and predicting performance information of virtual network functions that are newly generated or in which there is a change in the arrangement location or allocated resource amount, based on the accumulated performance information.

In other words, the network monitoring system of the present invention is a network monitoring system for monitoring a virtual network function, including: a function of acquiring information needed for detecting an abnormality in a virtual network function provided in a virtualization infrastructure, and predicting performance information of a virtual network function that is to be newly provided and monitored; a function of generating an abnormality determination rule that is to serve as a reference for determining whether or not actual performance information of a virtual network function falls within an allowed range that is set based on the predicted performance information; a function of performing abnormality determination using the actual performance information of the virtual network function and the abnormality determination rule; and a function of outputting an abnormality notification if it is determined by the determination means that there is an abnormality, and a function of outputting an abnormality notification if the result of the determination is that there is an abnormality.

Accordingly, according to the inventors, if a network function or a virtualization infrastructure is newly generated or if the network function arrangement location or allocated resource amount changes, the performance information of the virtual network function being monitored can be predicted using the accumulated performance information, and the virtual network function can be monitored promptly without providing a certain period for collecting performance information. As a result, it is possible to continuously perform abnormality detection. Hereinafter, an embodiment of the present invention will be described in detail with reference to the drawings.

Figure 1:
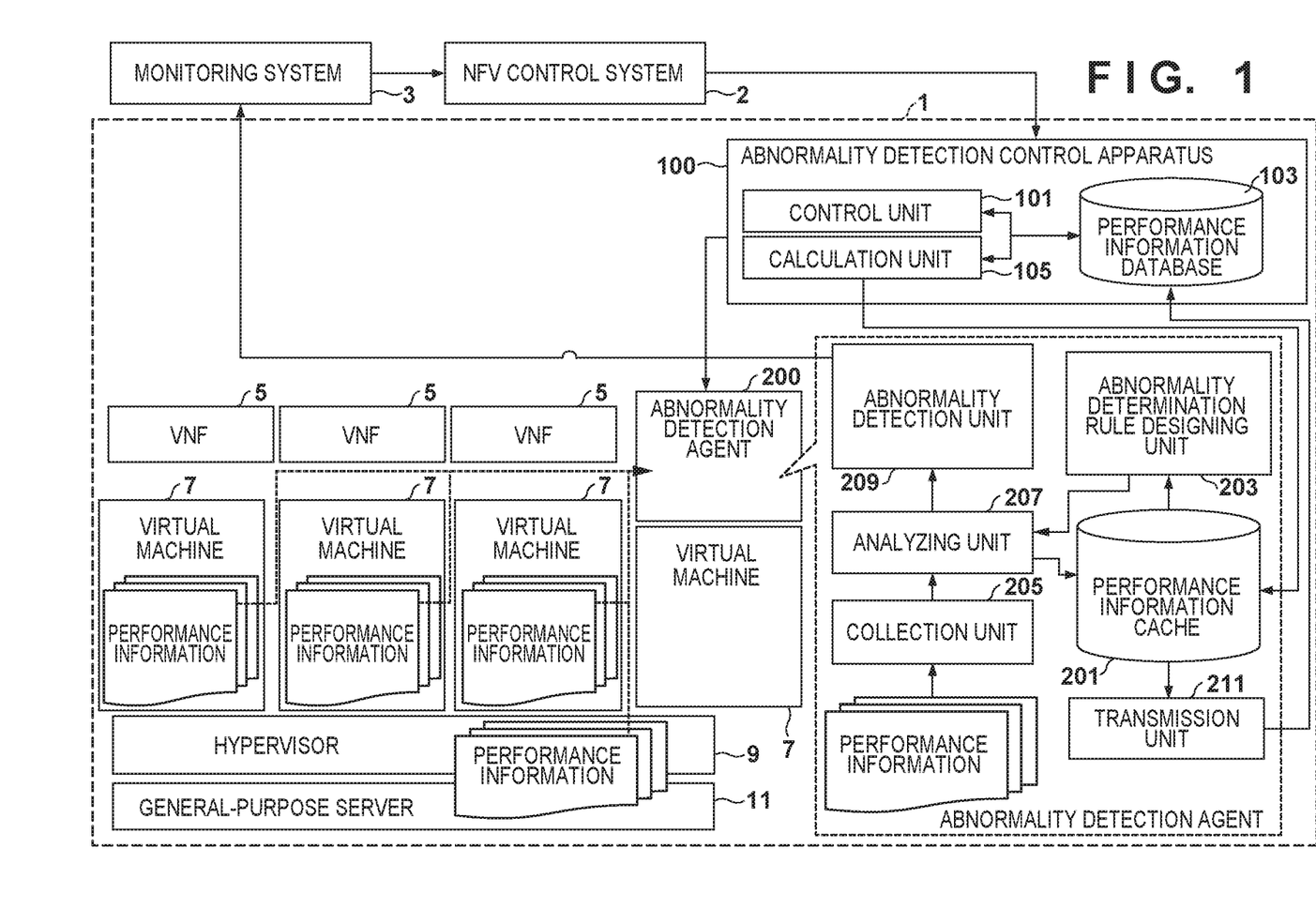
FIG. 1 is a drawing showing a schematic configuration of a network monitoring system according to an embodiment.

FIG. 1 is a drawing showing a schematic configuration of a network monitoring system according to the present embodiment. A network monitoring system 1 is constituted by an abnormality detection control apparatus 100 and an abnormality detection agent 200. The configuration shown in FIG. 1 is illustrated in order to facilitate understanding of the description, but the abnormality detection agent 200 is not limited to being arranged in the virtualization infrastructure and may be arranged anywhere as long as it is in the network.

The abnormality detection control apparatus 100 includes a control unit 101, a performance information database 103, and a calculation unit 105. The control unit 101 controls the creation, deletion, and re-configuration of the abnormality detection agent on the network. If an external system such as an NFV control system 2 newly generates a virtual network function, the abnormality detection control apparatus 100 acquires the information needed for abnormality detection, such as the VNF type, the management IP address of the arrangement server, and the allocated resource amount for the VNF from the NFV control system 2.

The performance information database 103 collects and stores the performance information during normal operation of the virtual network function on a network that was or is currently being monitored, from the abnormality detection agent 200 arranged on the network. The calculation unit 105 uses information (hereinafter referred to simply as "performance information") relating to the resource amount and the like stored in the performance information database 103 to predict the performance information of the newly-generated virtual network function, the virtual network function related to the newly-generated virtual network function, and the server in which the virtual network function is arranged. The abnormality detection control apparatus 100 transmits the predicted performance information to the abnormality detection agent 200.

The abnormality detection agent 200 includes a performance information cache 201, an abnormality determination rule designing unit 203, a collection unit 205, an analyzing unit 207, an abnormality notification unit 209, and a transmission unit 211. The performance information cache 201 acquires the performance information predicted by the abnormality detection control apparatus 100, which is transmitted from the abnormality detection control apparatus 100, and accumulates the data as performance information during normal operation.

The abnormality determination rule designing unit 203 generates an abnormality determination rule based on the performance information accumulated in the performance information cache 201 and applies the generated abnormality determination rule to the analyzing unit 207. The collection unit 205 periodically collects actual performance information (CPU usage rate, memory usage rate, network interface I/O, disk I/O, etc.) of the virtualization infrastructure, such as the virtual machine 7 and the hypervisor 9, which are used by the virtual network function 5, using a protocol such as SNMP (Simple Network Management Protocol) and CLI (Command Line Interface) command output results.

The analyzing unit 207 applies the abnormality determination rule to the collected actual performance information and performs abnormality determination processing. Then, the abnormality determination result is transmitted to the abnormality notification unit 209. Also, if the abnormality determination result is "normal", the actual performance information is transmitted to the performance information cache 201 and the actual performance information is accumulated in the performance information cache 201. If the acquired abnormality determination result is "abnormal", the abnormality notification unit 209 performs notification of the VNF abnormality information to an external system such as the monitoring system 3. The transmission unit 211 transmits the performance information during normal operation, which is accumulated in the performance information cache 201, to the performance information database 103 in response to a request from the abnormality detection control apparatus 100.

Figure 2:
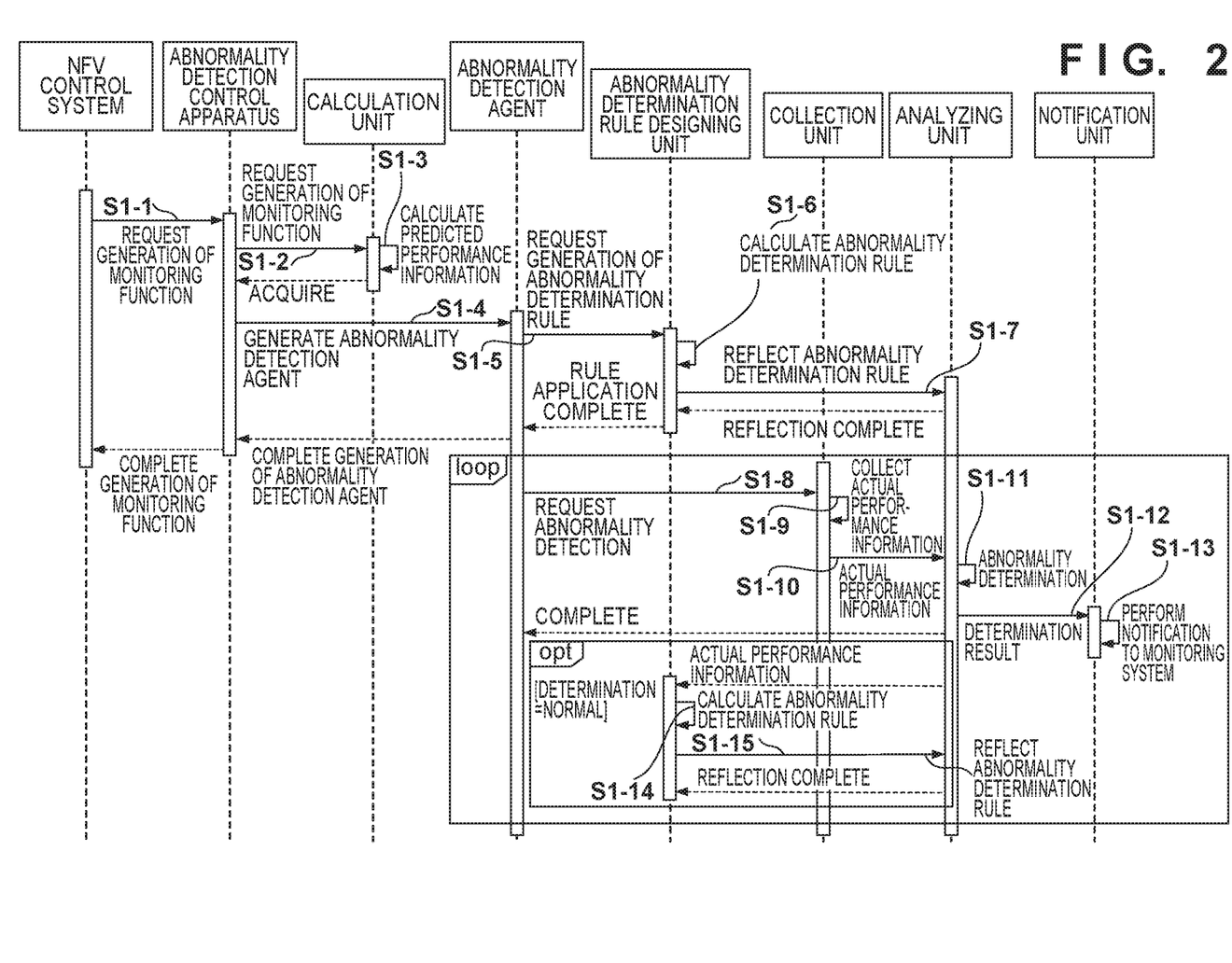
FIG. 2 is a sequence diagram showing a basic operation (generation) for abnormality detection according to an embodiment.

Next, basic operations of the system according to the present embodiment will be described with reference to FIGS. 2 and 3. FIG. 2 is a sequence diagram showing a basic operation (generation) for abnormality detection according to the present embodiment. First, the external system such as the NFV control system requests generation of a monitoring function to the abnormality detection control apparatus due to generation or reconfiguration of a virtual network function or a virtualization infrastructure (step S1-1). The request to generate the monitoring function includes information that is needed for abnormality detection, such as an identifier of the VNF type, a management IP address of the arrangement server, a management IP address of the VNF, information relating to the allocated resource amount for the VNF, and the like.

The abnormality detection control apparatus receives the request to generate the monitoring function from the NFV control system and requests prediction calculation of the performance information during normal operation for the virtual network function that is to be generated or reorganized (step S1-2). The calculation unit receives the request to perform prediction calculation of the performance information during normal operation and performs prediction calculation of the performance information during normal operation of the virtual network function that is to be generated or reorganized, based on the performance information during normal operation corresponding to the VNF type and the information (hereinafter also referred to as resource amount index) relating to the amount of resources allocated to the VNF, which are stored in the performance information database (step S1-3). An example of a calculation method for predicting the performance information during normal operation will be described later. Also, if the information that is needed for calculation of the performance information during normal operation of the virtual network function that is to be generated or reconfigured is not stored in the performance information database, the performance information during normal operation of an arranged virtual network function that is of the same type and has about the same resource amount as the virtual network function to be generated or reconfigured is acquired from the abnormality detection agent that has been applied to the arranged virtual network function.

Next, the abnormality detection control apparatus generates an abnormality detection agent (step S1-4). The abnormality detection agent is loaded as an application on the network and operates as at least one monitoring process for the virtual network function being monitored. The abnormality detection agent stores the predicted performance information generated in step S1-3 in the performance information cache.

The abnormality detection agent performs notification of a request to generate an abnormality determination rule to the abnormality determination rule designing unit (step S1-5). The abnormality determination rule designing unit generates the abnormality determination rule based on the performance information accumulated in the performance information cache (step S1-6). The generated abnormality determination rule is reflected in the analyzing unit (step S1-7).

The abnormality detection agent starts abnormality detection (step S1-8). The abnormality detection request performed by the abnormality detection agent is executed every predetermined period. When the abnormality detection request is executed, the collection unit collects the actual performance information for a predetermined period (e.g., six intervals of ten seconds) using a management protocol such as SNMP and a CLI command output result (step S1-9). The collection unit notifies the analyzing unit of the collected actual performance information (step S1-10). The analyzing unit carries out abnormality determination by comparing the abnormality determination rule with the collected actual performance information (step S1-11). Then, the notification unit is notified of the determination result (step S1-12). If the acquired determination result is "abnormal", the external system such as the monitoring system is notified of the abnormality of the virtual network function (step S1-13). The information of which the monitoring system is notified includes information that uniquely identifies the virtual network function.

In step S1-12, if the determination result is "normal", feedback processing for applying the collected actual performance information to the abnormality determination rule is performed. In other words, the collected actual performance information is accumulated in the performance information cache and the abnormality determination rule designing unit uses the accumulated actual performance information to perform updating of the abnormality determination rule (step S1-14). The updated abnormality determination rule is reflected in the analyzing unit (step S1-15).

Figure 3:
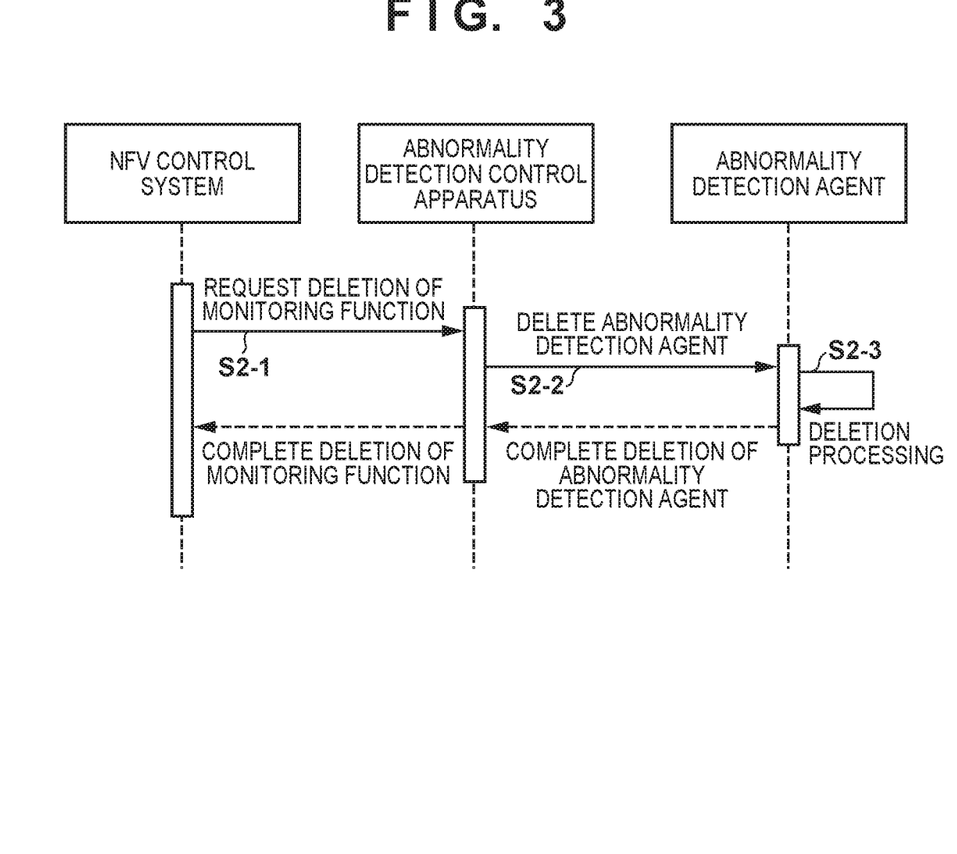
FIG. 3 is a sequence diagram showing a basic operation (deletion) for abnormality detection according to an embodiment.

FIG. 3 is a sequence diagram showing a basic operation (deletion) for abnormality detection according to the present embodiment. First, the external system such as the NFV control system requests deletion of a function to the abnormality detection control apparatus due to deletion of a virtual network function or a virtualization infrastructure (step S2-1). The monitoring function deletion request includes information such as an identifier of the VNF type and the management IP address.

The abnormality detection control apparatus receives the request to delete the monitoring function from the NFV control system and requests deletion to the abnormality detection agent (step S2-2). The abnormality detection agent receives the deletion request and performs the following deletion processing (step S2-3). First, the performance information included in the performance information cache is transmitted to the performance information database. The processes relating to abnormality detection are stopped. Then, the abnormality detection agent is deleted. After the deletion of the abnormality detection agent is complete, the abnormality detection control apparatus performs notification of the completion of the deletion of the monitoring function to the NFV control system.

Figure 4:
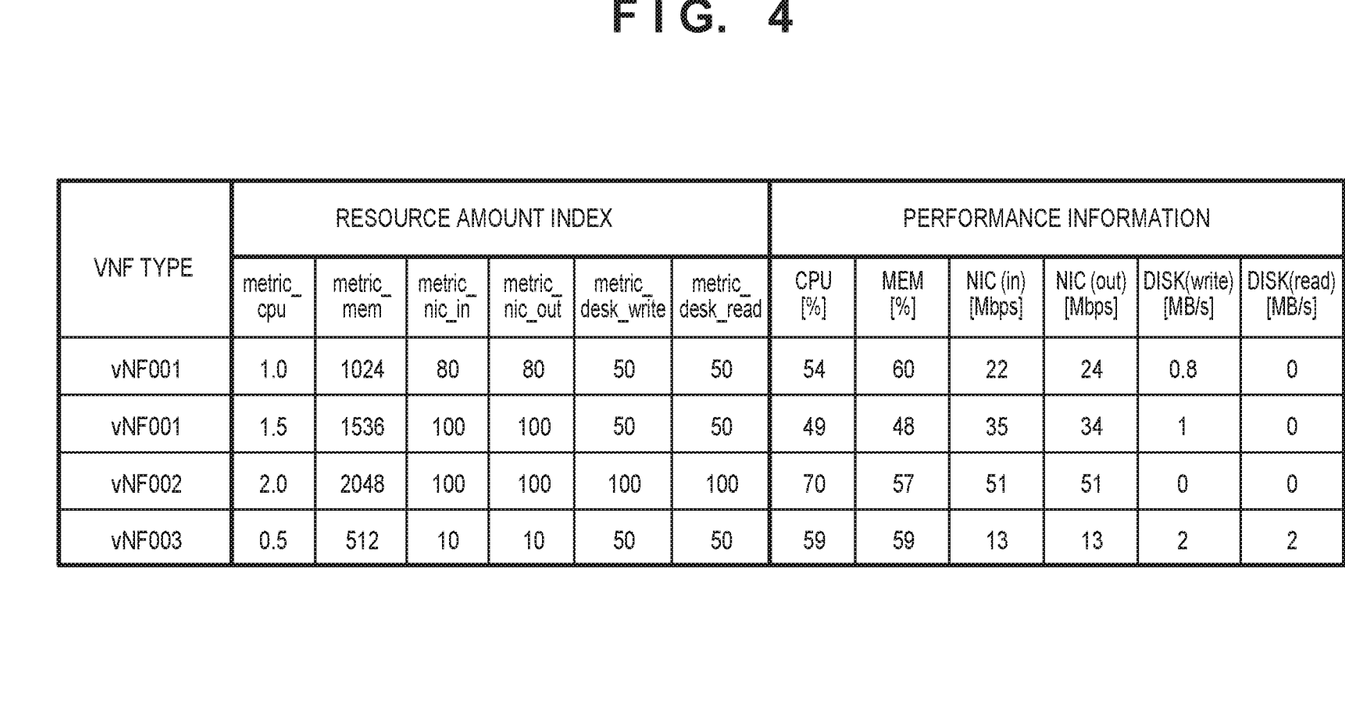
FIG. 4 is a diagram showing an example of information stored in a performance information DB.

Next, the information stored in the performance information database will be described. FIG. 4 is a diagram showing an example of information stored in a performance information database. The performance information database uses the VNF type as an index to hold at least the resource amount index and the performance information that are derived based on the amount of resources allocated to the VNF. For example, the resource amount index is calculated based on a pre-defined calculation equation for resource amount indices such as the CPU (allocated core number and allocation policy), memory (allocated memory and swap amount), network interface (interface type and band allocation policy information), and disk (disk interface type and disk resource policy information). The type and calculation equation for the stored information relating to the resource amount calculation can be changed flexibly by a maintenance operator or a system administrator changing the setting file description of the abnormality detection control apparatus.

As the method for calculating the resource amount index, for example, the CPU resource amount indices can be calculated using the CPU processing time allocated to the VM, the interval for re-allocating access to the CPU, and the number of CPU cores allocated to the VM. The MEM resource amount index can be calculated using the ensured capacity [KB] of the memory and the ensured capacity [KB] for swapping. Also, the NIC resource amount index can be calculated using the input band limit [B/s] and the output band limit [B/s]. Also, the DISK resource amount index can be calculated using the Disk I/O throughput per second [B/s] and the number of read/written bytes per second [B/s].

Figure 5A:
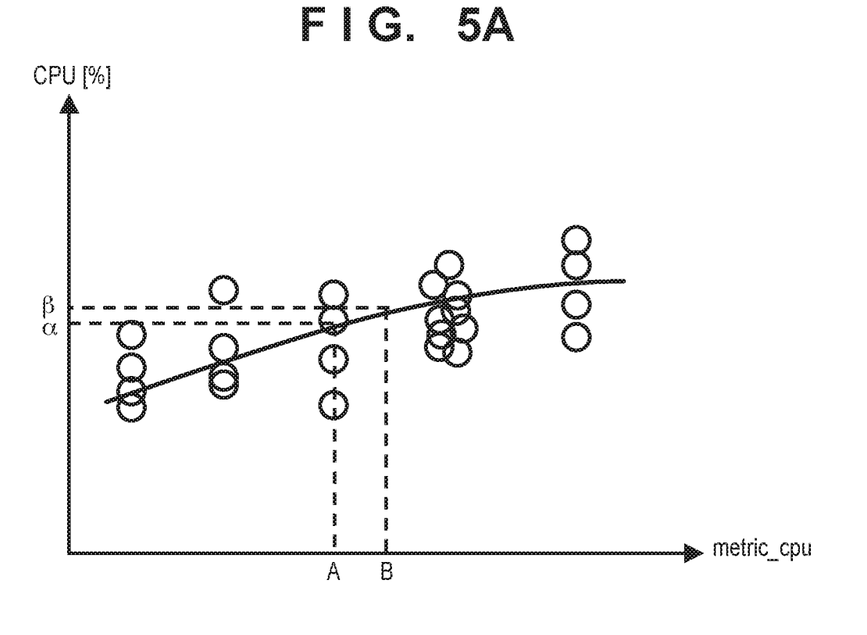
FIG. 5A is a graph showing performance changes according to VNF type.

Next, a method for calculating the performance information will be described. FIG. 5A is a graph showing performance changes according to VNF type. First, as [Step 1], the variation in the resource amount indices for the performance information is obtained. A general regressive analysis method such as linear approximation or polynomial approximation is used on the already-collected resource amount indices to derive the correlative relationship of the performance information with respect to the resource amount indices. A reference value ($\beta$) for the performance information of the virtual network function is set according to the resource amount index (B) and the correlative relationship of the virtual network function that is newly being monitored.

Figure 5B:
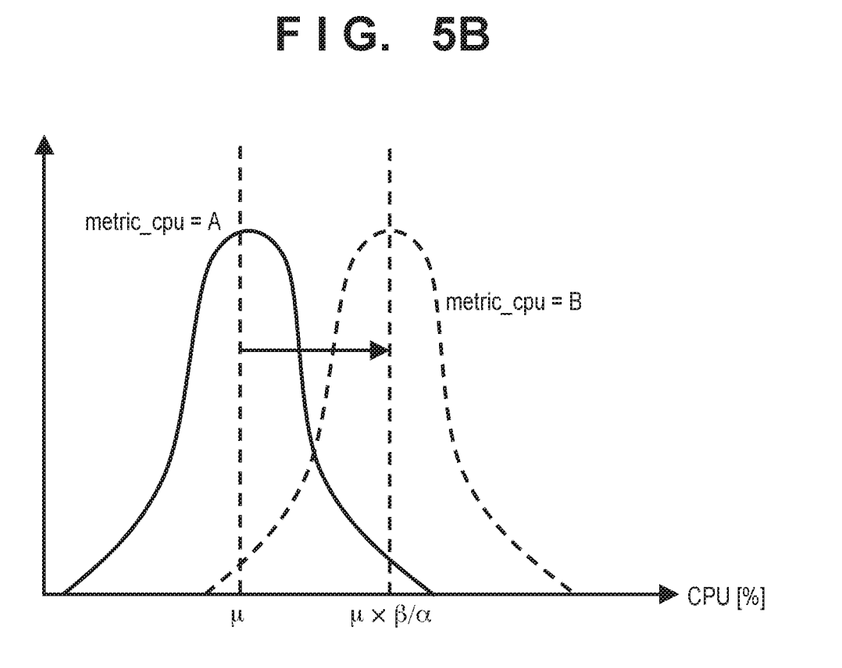
FIG. 5B is a graph showing a distribution relating to CPU usage rate.

FIG. 5B is a graph showing a distribution relating to CPU usage rate. In [Step 2], which follows [Step 1], the distribution relating to the CPU usage rate is obtained. In the collected performance information, shaping processing is performed on the pieces of performance information using the performance information (A) that is the closest to (has the smallest Euclidean distance from) the resource amount index as a sample and using the correlative relationship obtained in Step 1. In FIG. 5B, the performance information distribution is assumed to be a regular distribution model and parallel displacement of $\beta/\alpha$ is carried out in the pieces of performance information relating to the CPU for metric_cpu=A. The performance information subjected to the shaping processing is stored in the performance cache of the abnormality detection agent as predicted performance information.

As described above, according to the present embodiment, if a network function or a virtualization infrastructure is newly generated or if the arrangement location or allocated resource amount for a virtual network function changes on a network, the performance information of the virtual network function being monitored can be predicted using the accumulated performance information, and the virtual network function can be monitored promptly without providing a certain period for collecting performance information.

In the description above, the network monitoring system acquires the information needed to detect an abnormality in the virtual network function provided in the virtualization infrastructure, predicts the performance information of the virtual network function that is to be newly provided and monitored, generates an abnormality determination rule that is to serve as a reference for determining whether or not the actual performance information of the virtual network function falls within an allowed range that is set based on the predicted performance information, carries out abnormality determination using the actual performance information and the abnormality determination rule of the virtual network function, and outputs an abnormality notification if the result of the determination is that there is an abnormality. Accordingly, if a virtual network function or a virtualization infrastructure is newly generated, or if the arrangement location or allocated resource amount of a virtual network function changes, the performance information of the virtual network function to be monitored can be predicted using the accumulated performance information, and thus the virtual network function can be monitored promptly without providing a certain period for collecting performance information. As a result, it is possible to continuously perform abnormality detection.

Also, by accumulating the actual performance information of the newly-acquired virtual network function in the performance information cache, it is possible to perform abnormality detection based on the actual performance information of the virtual network function and a higher-quality network can be provided.

Furthermore, by updating the generated abnormality determination rule using the accumulated performance information, it is possible to create an abnormality detection rule that is suitable for the virtual network function and a higher-quality network can be provided.

Furthermore, the information that is needed for detecting an abnormality in the virtual network function can include at least the virtual network function type of the virtual network function and the amount of resources allocated to the virtual network function. Accordingly, even if there is no performance information relating to the newly-generated virtual network function, the performance information of the newly-generated virtual network function can be calculated using the performance information of the information of a virtual network function that has a similar configuration and is arranged in the environment, and it is possible to promptly monitor the virtual network function.

Also, the abnormality detection control apparatus accumulates performance information during normal operation for each virtual network function, acquires information needed for detecting an abnormality in a virtual network function, and predicts performance information of a virtual network function that is to be newly provided and monitored, and generates, reconfigures, or deletes an abnormality detection agent on a virtualization infrastructure on the network, and the abnormality detection agent collects actual performance information on a virtual network function being monitored and on a virtualization infrastructure; generates an abnormality determination rule that is to serve as a reference for determining whether or not actual performance information of a virtual network function on a virtualization infrastructure falls within an allowed range that is set based on the predicted performance information, performs abnormality determination using the collected actual performance information and the generated abnormality determination rule, and outputs an abnormality notification if the result of the determination is that there is an abnormality. Accordingly, if a virtual network function or a virtualization infrastructure is newly generated, or if the arrangement location or allocated resource amount for a virtual network function changes, the performance information of the virtual network function to be monitored can be predicted using the accumulated performance information and the virtual network function can be monitored promptly without providing a certain period for collecting performance information. As a result, it is possible to continuously perform abnormality detection.

Also, the abnormality detection agent can accumulate the collected actual performance information. Accordingly, abnormality detection can be performed based on the actual performance information of the virtual network function, and it is possible to provide a higher-quality network.

Also, in response to a request from the abnormality detection control apparatus, the abnormality detection agent can transmit the actual performance information accumulated in the performance information cache to the performance information database. Accordingly, it can be used if a virtual network function is newly generated or reconfigured, or if the performing information during normal operation is to be predicted. Also, when there is a request from the abnormality detection control apparatus, the load on the network can be reduced by transmitting the accumulated actual performance information from the performance information cache to the performance information database.

Also, the abnormality determination rule designing unit can update the abnormality determination rule using the collected actual performance information and thus can create an abnormality determination rule that is suitable for the virtual network function being monitored.

Also, the information that is needed for detecting an abnormality in the virtual network function can include at least the virtual network function type of the virtual network function and the amount of resources allocated to the virtual network function. Accordingly, suitable performance information can be predicted promptly and abnormality detection can be performed, even for a newly-generated virtual network function.

The present invention is not limited to the above-described embodiment, and various changes and modifications are possible without departing from the spirit and scope of the present invention. Accordingly, the following claims are attached in order to publish the scope of the present invention.

The invention claimed is:

1. A network monitoring system for monitoring a virtual network function, comprising:
a prediction unit configured to acquire information needed for detecting an abnormality in a virtual network function provided in a virtualization infrastructure, and predict performance information of a virtual network function that is to be newly provided and monitored;
a generation unit configured to generate an abnormality determination rule that is to serve as a reference for determining whether or not actual performance information of a virtual network function falls within an allowed range that is set based on the predicted performance information;
a determination unit configured to perform abnormality determination using the actual performance information of the virtual network function and the abnormality determination rule; and
an output unit configured to output an abnormality notification if it is determined by the determination unit that there is an abnormality.

2. The network monitoring system according to claim 1, further comprising an accumulation unit configured to accumulate actual performance information of a newly-acquired virtual network function in a performance information cache as performance information during normal operation.

3. The network monitoring system according to claim 2, further comprising an updating unit configured to update the generated abnormality determination rule using the accumulated performance information.

4. The network monitoring system according to claim 1, wherein the information needed for determining an abnormality in the virtual network function includes at least a virtual network function type of a virtual network function, and an allocated resource amount for the virtual network function.

5. A network monitoring system in which at least one abnormality detection agent and an abnormality detection control apparatus monitor a virtual network function, wherein
the abnormality detection control apparatus includes:
a performance information database configured to accumulate performance information during normal operation for each virtual network function;
a calculation unit configured to acquire information needed for detecting an abnormality in a virtual network function, and predict performance information of a virtual network function that is to be newly provided and monitored; and
a control unit configured to generate, reconfigure, or delete an abnormality detection agent on any virtualization infrastructure on a network, and
the abnormality detection agent includes:
a collection unit configured to collect actual performance information on a virtual network function being monitored and on a virtualization infrastructure;
an abnormality determination rule designing unit configured to generate an abnormality determination rule that is to serve as a reference for determining whether or not actual performance information of a virtual network function on a virtualization infrastructure falls within an allowed range that is set based on the predicted performance information;
an analyzing unit configured to perform abnormality determination using the collected actual performance information and the generated abnormality determination rule; and
a notification unit configured to output an abnormality notification if the result of the determination is that there is an abnormality.

6. The network monitoring system according to claim 5, wherein the abnormality detection agent further includes a performance information cache configured to accumulate the collected actual performance information.

7. The network monitoring system according to claim 6, wherein the abnormality detection agent further includes a transmission unit configured to transmit the actual performance information accumulated in the performance information cache to the performance information database in response to a request from the abnormality detection control apparatus.

8. The network monitoring system according to claim 5, wherein the abnormality determination rule designing unit includes an updating unit configured to update the abnormality determination rule using the collected actual performance information.

9. The network monitoring system according to claim 5, wherein the information needed for determining an abnormality in the virtual network function includes at least a virtual network function type of a virtual network function, and an allocated resource amount for the virtual network function.

10. A network monitoring method for monitoring a virtual network function, wherein
an abnormality detection control apparatus performs:
accumulating performance information during normal operation of a virtual network function provided on a virtualization infrastructure;
acquiring information needed for detecting an abnormality in a virtual network function and predicting performance information of a virtual network function that is to be newly provided and monitored; and
generating an abnormality detection agent on a virtualization infrastructure in which the virtual network function to be monitored exists, and
the abnormality detection agent performs:
collecting actual performance information on a virtual network function being monitored and a virtualization infrastructure;
generating an abnormality determination rule that is to serve as a reference for determining whether or not actual performance information of a virtual network function on a virtualization infrastructure falls within an allowed range that is set based on the predicted performance information;
performing abnormality determination using the collected actual performance information and the generated abnormality determination rule; and
outputting an abnormality notification if the result of the determination is that there is an abnormality.

11. A non-transitory computer-readable storage medium including a computer program for a network monitoring system in which a virtual network function is monitored by an abnormality detection control apparatus configured to perform control for accumulating performance information during normal operation of at least one abnormality detection agent and for network functions in a performance information database, acquiring information needed for detecting an abnormality in a virtual network function, predicting performance information of a virtual network function that is to be newly provided and monitored, and generating, reconfiguring, or deleting an abnormality detection agent on any virtualization infrastructure on a network, the program being for causing a computer to execute:
collecting actual performance information on a virtual network function being monitored and on a virtualization infrastructure;
generating an abnormality determination rule that is to serve as a reference for determining whether or not actual performance information of a virtual network function on a virtualization infrastructure falls within an allowed range that is set based on the predicted performance information;
performing abnormality determination using the collected actual performance information and the generated abnormality determination rule; and
outputting an abnormality notification if the result of the determination is that there is an abnormality.

12. A non-transitory computer-readable storage medium including a computer program for a network monitoring system in which a virtual network function is monitored by an abnormality detection control apparatus and at least one abnormality detection agent configured to collect actual performance information on a virtual network function that is to be monitored and on a virtualization infrastructure, generate an abnormality determination rule that is to serve as a reference for determining whether or not the actual performance information of each virtual network function on the virtualization infrastructure falls within an allowed range that is set based on the predicted performance information, perform abnormality determination using the collected actual information and the generated abnormality determination rule, and output an abnormality notification if the result of the determination is that there is an abnormality, the program being for causing a computer to execute:

accumulating performance information during normal operation for each virtual network function;

acquiring information needed for detecting an abnormality in a virtual network function and predicting performance information of a virtual network function that is to be newly provided and monitored; and     performing control for generating, reconfiguring, or deleting an abnormality detection agent on any virtualization infrastructure on a network.

* * * * *